US010567768B2

(12) United States Patent
Fu et al.

(10) Patent No.: US 10,567,768 B2
(45) Date of Patent: Feb. 18, 2020

(54) TECHNIQUES FOR CALCULATION OF QUANTIZATION MATRICES IN VIDEO CODING

(71) Applicant: Apple Inc., Cupertino, CA (US)

(72) Inventors: Xiang Fu, Mountain View, CA (US); Xiaohua Yang, San Jose, CA (US); Linfeng Guo, Cupertino, CA (US); Francesco Iacopino, San Jose, CA (US); Krishna Rapaka, San Jose, CA (US); Felix Chou, Saratoga, CA (US); Mukta Gore, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 244 days.

(21) Appl. No.: 15/487,853

(22) Filed: Apr. 14, 2017

(65) Prior Publication Data
US 2018/0302621 A1  Oct. 18, 2018

(51) Int. Cl.
| | |
|---|---|
| *H04N 19/124* | (2014.01) |
| *H04L 29/06* | (2006.01) |
| *H04N 19/105* | (2014.01) |
| *H04N 19/117* | (2014.01) |
| *H04N 19/176* | (2014.01) |

(Continued)

(52) U.S. Cl.
CPC ....... *H04N 19/124* (2014.11); *H04L 65/4069* (2013.01); *H04L 65/607* (2013.01); *H04N 19/105* (2014.11); *H04N 19/117* (2014.11); *H04N 19/176* (2014.11); *H04N 19/61* (2014.11); *H04N 19/85* (2014.11)

(58) Field of Classification Search
None
See application file for complete search history.

(56) References Cited

U.S. PATENT DOCUMENTS

| | | | |
|---|---|---|---|
| 7,372,903 B1* | 5/2008 | Lee ...................... | H04N 19/172 375/240 |
| 7,916,952 B2* | 3/2011 | Demos ................... | H03M 7/24 382/232 |

(Continued)

OTHER PUBLICATIONS

Prangnell, L. et al., "Adaptive Quantization Matrices for HD and UHD Display Resolutions in Scalable HEVC", 2016 Data Compression Conference (DCC) (Mar. 30-Apr. 1, 2016) (Year: 2016).*

(Continued)

*Primary Examiner* — Lindsay J Uhl
(74) *Attorney, Agent, or Firm* — BakerHostetler

(57) ABSTRACT

Techniques are disclosed for developing quantization matrices for use in video coding. According to these techniques a first quantization matrix may be derived from a second quantization matrix by scaling quantization values of the second quantization matrix by scaling parameters. The scaling parameters may increase according to distance between each matrix position and a matrix origin, they may be derived from characteristics of a video sequence to be coded, or both. The first quantization matrix may be communicated to a decoder. Thereafter, a video sequence may be coded predictively. As part of the coding, pixel data of the video sequence may be transformed to a plurality of frequency domain coefficients, and the frequency domain coefficients may be quantized according to the first quantization matrix.

27 Claims, 5 Drawing Sheets

(51) Int. Cl.
H04N 19/61 (2014.01)
H04N 19/85 (2014.01)

(56) References Cited

U.S. PATENT DOCUMENTS

| | | | |
|---|---|---|---|
| 8,135,068 B1 * | 3/2012 | Alvarez | H04N 19/176 |
| | | | 375/240.12 |
| 8,594,189 B1 * | 11/2013 | Bankoski | H04N 19/105 |
| | | | 375/240.03 |
| 8,908,984 B2 * | 12/2014 | Carmel | H04N 19/176 |
| | | | 382/239 |
| 9,258,568 B2 * | 2/2016 | Zheng | H04N 19/176 |
| 2007/0280349 A1 * | 12/2007 | Prieto | H04N 19/124 |
| | | | 375/240.03 |
| 2010/0309987 A1 * | 12/2010 | Concion | H04N 5/772 |
| | | | 375/240.26 |
| 2013/0188691 A1 | 7/2013 | Haque et al. | |
| 2014/0369407 A1 * | 12/2014 | Tanaka | H04N 19/70 |
| | | | 375/240.03 |

OTHER PUBLICATIONS

"Adaptive Quantization Matrices for HD and UHD Resolutions in Scaleable HEVC," IEEE.org, IEEE Xplore Digital Library; http://ieeexplore.ieee.org/document/7786250/?reload=true, Apr. 14, 2017.
"Quantization Matrix Coding for High Efficiency Video Coding," SpringerLink; https://link.springer.com/chapter/10.1007/978-3-642-34595-1_34, Apr. 14, 2017.

* cited by examiner

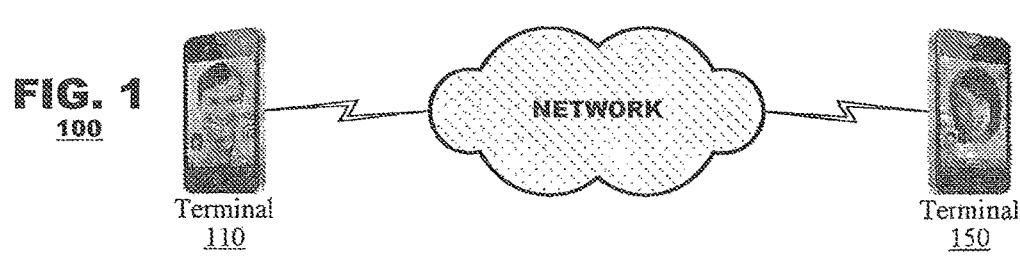
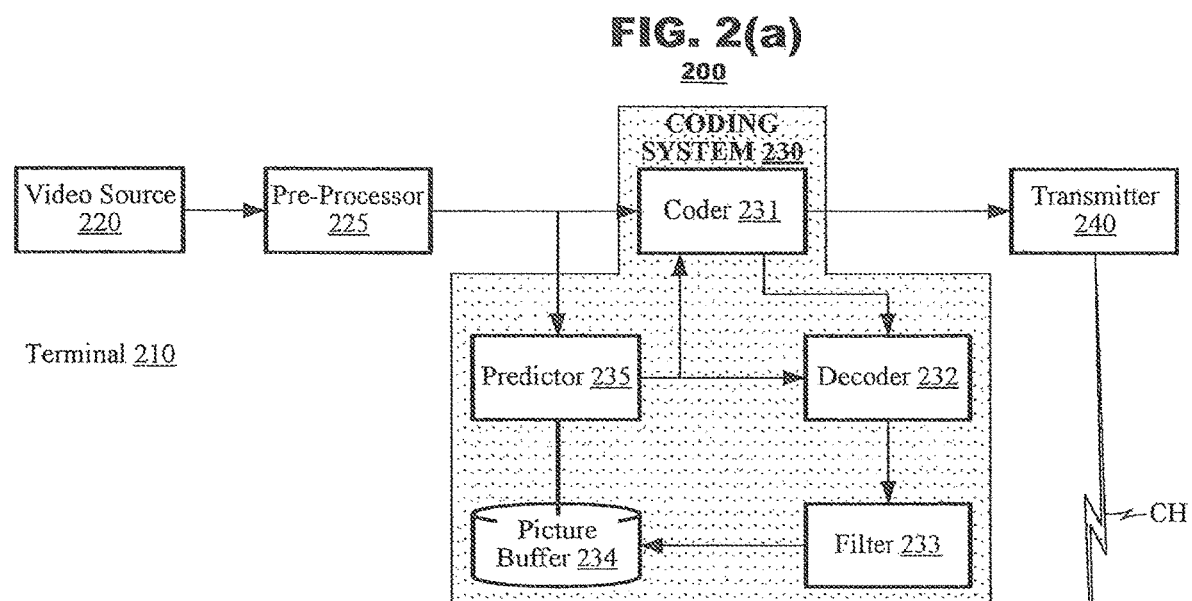
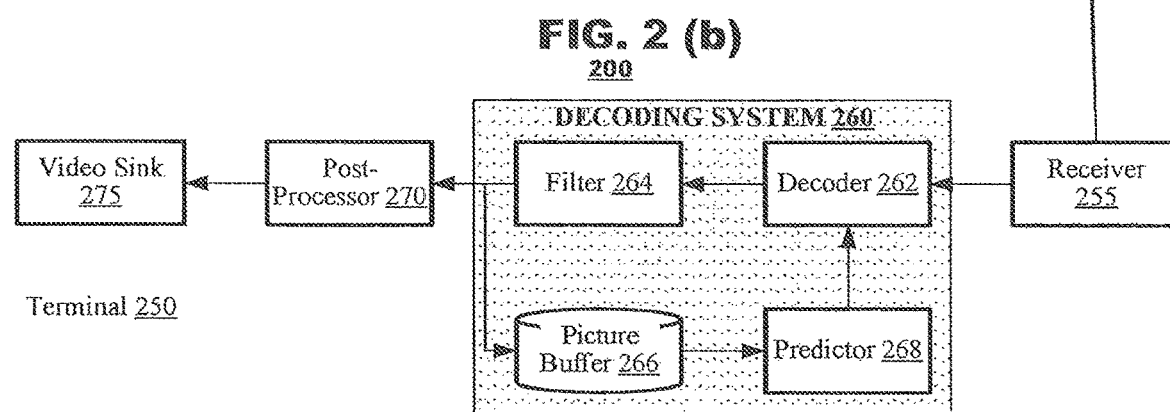

300

600

TECHNIQUES FOR CALCULATION OF QUANTIZATION MATRICES IN VIDEO CODING

BACKGROUND

The present disclosure relates to video coding techniques and, in particular, for developing quantization matrices that perform bandwidth reduction and perceptual/visual quality improvement in video compression operations.

Many modern electronic devices perform video compression. Consumer devices, for example, including laptop computers, notebook computers, tablet computers and smart phones, often capture video information representing local image content and transmit the video information to another device for rendering. Video compression operations exploit temporal and spatial redundancies in the video information to lower its bitrate for transmission over a network.

In one common technique, image data from each input frame is transformed from a pixel-based representation to a frequency-based representation. Thus, the image information is represented as a plurality of transform coefficients, each coefficient representing a frequency component of image information within its domain. Typically, an input frame is partitioned into a plurality of pixel blocks prior to transform and, thus, the transform coefficients provide frequency-domain information regarding the image content within its pixel block.

Further bandwidth compression may be achieved by quantizing the transform coefficients prior to transmission. Quantization involves dividing the transform coefficients by quantization values, which reduces the magnitudes of the transform coefficients. The quantized coefficients typically are transmitted as integer representations, which causes information loss when the quantization does not yield integer values—fractional portions of the quantized coefficients are discarded prior to transmission and cannot be recovered on decode. Thus, quantization poses a tradeoff for designers of video coding systems: Assigning aggressive quantization parameters can lead to good compression of bandwidth but it may induce visual artifacts that impair the perceived quality of the video when it is decoded. On the other hand, assigning low quantization parameters can preserve the perceived quality of the video when it is decoded but contribute little to bandwidth conservation.

The inventors perceive a need for quantization control techniques that adapt flexibly to changing conditions of video capture. Moreover, the inventors perceive a need in the art for quantization control techniques that preserve image information that likely has greatest visual significance.

BRIEF DESCRIPTION OF THE DRAWINGS

FIG. 1 illustrates a simplified block diagram of a video delivery system according to an embodiment of the present disclosure.

FIGS. 2(a) and 2(b) are functional block diagrams illustrating components of an encoding terminal and a decoding terminal, respectively, according to embodiments of the present disclosure.

DETAILED DESCRIPTION

Figure 3:
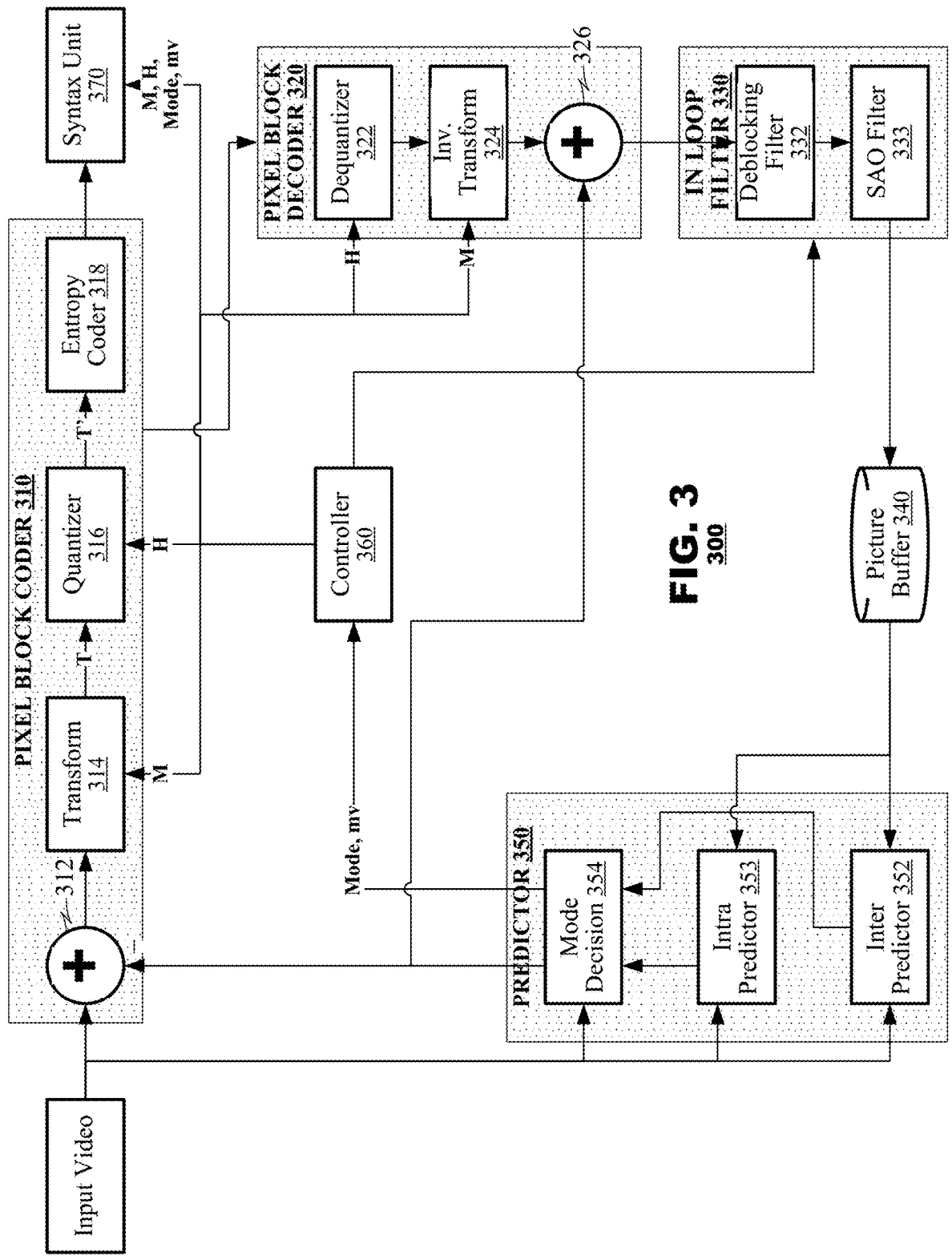
FIG. 3 is a functional block diagram of a coding system according to an embodiment of the present disclosure.

Embodiments of the present disclosure provide techniques for developing quantization matrices for use in video coding. According to these techniques a first quantization matrix may be derived from a second quantization matrix by scaling quantization values of the second quantization matrix by scaling parameters. The scaling parameters are derived in one example from characteristics of a video sequence. In another example, the scaling parameters are derived according to distance between each matrix position and a matrix origin. The first quantization matrix may be communicated to a decoder. In one example, the quantization matrix is signaled in a separate picture parameter set. Thereafter, a video sequence may be coded predictively. As part of the coding, pixel data of the video sequence may be transformed to a plurality of frequency domain coefficients, and the frequency domain coefficients may be quantized according to the first quantization matrix. In this manner, the first quantization matrix may be defined to provide an appropriate balance between bandwidth conservation and preservation of image information that likely has greatest visual significance on decode.

FIG. 1 illustrates a simplified block diagram of a video delivery system 100 according to an embodiment of the present disclosure. The system 100 may include a plurality of terminals 110, 150 interconnected via a network. The terminals 110, 150 may code video data for transmission to their counterparts via the network. Thus, a first terminal 110 may capture video data locally, code the video data and transmit the coded video data to the counterpart terminal 150 via a channel. The receiving terminal 150 may receive the coded video data, decode it, and render it locally, for example, on a display at the terminal 150. If the terminals are engaged in bidirectional exchange of video, then the terminal 150 may capture video data locally, code the video data and transmit the coded video data to the counterpart terminal 110 via another channel. The receiving terminal 110 may receive the coded video data transmitted from terminal 150, decode it, and render it locally, for example, on its own display. The processes described can operate on both frame and field picture coding but, for simplicity, the present discussion will describe the techniques in the context of integral frames.

A video coding system 100 may be used in a variety of applications. In a first application, the terminals 110, 150 may support real-time bidirectional exchange of coded video to establish a video conferencing session between them. In another application, a terminal 110 may code pre-produced video (for example, television or movie programming) and store the coded video for delivery to one or, often, many downloading clients (e.g., terminal 150). Thus, the video being coded may be live or pre-produced, and the terminal 110 may act as a media server, delivering the coded video according to a one-to-one or a one-to-many distribution model. For the purposes of the present discussion, the type of video and the video distribution schemes are immaterial unless otherwise noted.

Typically, the terminals 110, 150 operate according to a predetermined coding protocol such as ITU-T H.265 (commonly, "HEVC"), H.264 or another coding protocol. The terminals' representation of coded video, therefore, adheres to syntax requirements and coding techniques defined in the protocol that governs a coding session between them.

In FIG. 1, the terminals 110, 150 are illustrated as smart phones but the principles of the present disclosure are not so limited. Embodiments of the present disclosure also find application with computers (both desktop and laptop computers), computer servers, media players, dedicated video conferencing equipment and/or dedicated video encoding equipment.

The network represents any number of networks that convey coded video data between the terminals 110, 150, including for example wireline and/or wireless communication networks. The communication network may exchange data in circuit-switched or packet-switched channels. Representative networks include telecommunications networks, local area networks, wide area networks, and/or the Internet. For the purposes of the present discussion, the architecture and topology of the network are immaterial to the operation of the present disclosure unless otherwise noted.

FIG. 2(a) is a functional block diagram illustrating components of an encoding terminal 210. The encoding terminal 210 may include a video source 220, a pre-processor 225, a coding system 230, and a transmitter 240. The video source 220 may supply video to be coded. The video source 220 may be provided as a camera that captures image data of a local environment, an application program executing on the terminal 210 that supplies synthetic video (e.g., computer graphics), or a storage device that stores video from some other source. The pre-processor 225 may perform signal conditioning operations on the video to be coded to prepare the video data for coding. For example, the preprocessor 225 may alter frame rate, frame resolution, and other properties of the source video. The preprocessor 225 also may perform filtering operations on the source video.

The coding system 230 may perform coding operations on the video to reduce its bandwidth. Typically, the coding system 230 exploits temporal and/or spatial redundancies within the source video. For example, the coding system 230 may perform motion compensated predictive coding in which video frame or field pictures are parsed into sub-units (called "pixel blocks," for convenience), and individual pixel blocks are coded differentially with respect to predicted pixel blocks, which are derived from previously-coded video data. A given pixel block may be coded according to any one of a variety of predictive coding modes, such as:

- intra-coding, in which an input pixel block is coded differentially with respect to previously coded/decoded data of a common frame;
- single prediction inter-coding, in which an input pixel block is coded differentially with respect to data of a previously coded/decoded frame; and
- bi-predictive inter-coding, in which an input pixel block is coded differentially with respect to data of a pair of previously coded/decoded frames.
- Combined inter-intra coding in which an input pixel block is coded differentially with respect to data from both a previously coded/decoded frame and data from the current/common frame.
- Multi-hypothesis inter-intra coding, in which an input pixel block is coded differentially with respect to data from several previously coded/decoded frames, as well as potentially data from the current/common frame.

Pixel blocks also may be coded according to other coding modes such as the Transform Skip and Reduced-Resolution Update (RRU) coding modes.

The coding system 230 may include a coder 231, a decoder 232, an in-loop filter 233, a picture buffer 234, and a predictor 235. The coder 231 may apply the differential coding techniques to the input pixel block using predicted pixel block data supplied by the predictor 235. The decoder 232 may invert the differential coding techniques applied by the coder 231 to a subset of coded frames designated as reference frames. The in-loop filter 233 may apply filtering techniques to the reconstructed reference frames generated by the decoder 232. The picture buffer 234 may store the reconstructed reference frames for use in prediction operations. The predictor 235 may predict data for input pixel blocks from within the reference frames stored in the picture buffer.

The transmitter 240 may transmit coded video data to a decoding terminal 250 via a channel CH.

FIG. 2(b) is a functional block diagram illustrating components of a decoding terminal 250 according to an embodiment of the present disclosure. The decoding terminal 250 may include a receiver 255 to receive coded video data from the channel, a video decoding system 260 that decodes coded data, a post-processor 270 that processes recovered video for rendering, and a video sink 275 that consumes the video data.

The receiver 255 may receive a data stream from the network and may route components of the data stream to appropriate units within the terminal 250. Although FIGS. 2(a) and 2(b) only illustrate functional units for video coding and decoding, terminals 210, 250 typically will include coding/decoding systems for audio data associated with the video and perhaps other processing units (not shown). Thus, the receiver 255 may parse the coded video data from other elements of the data stream and route it to the video decoder 260.

The video decoder 260 may perform decoding operations that invert coding operations performed by the coding system 230. The video decoder may include a decoder 262, an in-loop filter 264, a picture buffer 266, and a predictor 268. The decoder 262 may invert the differential coding techniques applied by the coder 231 to the coded frames. The in-loop filter 233 may apply filtering techniques to reconstructed frame data generated by the decoder 262. For example, the in-loop filter 233 may perform various filtering operations (e.g., de-blocking, de-ringing filtering, sample adaptive offset processing, and the like). The filtered frame data may be output from the decoding system. The picture buffer 266 may store reconstructed reference frames for use in prediction operations. The predictor 268 may predict data for input pixel blocks from within the reference frames stored by the picture buffer according to prediction reference data provided in the coded video data.

The post-processor 270 may perform operations to condition the reconstructed video data for display. For example, the post-processor 270 may perform various filtering operations (e.g., de-blocking, de-ringing filtering, and the like), which may obscure visual artifacts in output video that are generated by the coding/decoding process. The post-processor 270 also may alter resolution, frame rate, color space, etc. of the reconstructed video to conform it to requirements of the video sink 275.

The video sink 275 represents various hardware and/or software components in a decoding terminal 250 that may consume the reconstructed video. The video sink 275 typically may include one or more display devices on which reconstructed video may be rendered. Alternatively, the video sink 275 may be represented by a memory system that stores the reconstructed video for later use. The video sink 275 also may include one or more application programs that process the reconstructed video data according to controls provided in the application program. In some embodiments, the video sink may represent a transmission system that transmits the reconstructed video to a display on another device, separate from the decoding terminal 250; for example, reconstructed video generated by a notebook computer may be transmitted to a large flat panel display for viewing.

The foregoing discussion of the encoding terminal 210 and the decoding terminal 250 (FIGS. 2(a) and 2(b)) illustrates operations that are performed to code and decode video data in a single direction between terminals, such as from terminal 110 to terminal 150 (FIG. 1). In applications where bidirectional exchange of video is to be performed between the terminals 110, 150, each terminal 110, 150 will possess the functional units associated with an encoding terminal (FIG. 2(a)) and each terminal 210, 250 also will possess the functional units associated with a decoding terminal (FIG. 2(b)). Indeed, in certain applications, terminals 110, 150 may exchange multiple streams of coded video in a single direction, in which case, a single terminal (say terminal 110) will have multiple instances of an encoding terminal (FIG. 2(a)) provided therein. Such implementations are fully consistent with the present discussion.

FIG. 3 is a functional block diagram of a coding system 300 according to an embodiment of the present disclosure. The system 300 may include a pixel block coder 310, a pixel block decoder 320, an in-loop filter system 330, a picture buffer 340, a predictor 350, a controller 360, and a syntax unit 370. The pixel block coder and decoder 310, 320 and the predictor 350 may operate iteratively on individual pixel blocks of a picture. The predictor 350 may predict data for use during coding of a newly-presented input pixel block. The pixel block coder 310 may code the new pixel block by predictive coding techniques and present coded pixel block data to the syntax unit 370. The pixel block decoder 320 may decode the coded pixel block data, generating decoded pixel block data therefrom. The in-loop filter 330 may perform various filtering operations on a decoded picture that is assembled from the decoded pixel blocks obtained by the pixel block decoder 320. The filtered picture may be stored in the picture buffer 340 where it may be used as a source of prediction of a later-received pixel block. The syntax unit 370 may assemble a data stream from the coded pixel block data which conforms to a governing coding protocol.

The pixel block coder 310 may include a subtractor 312, a transform unit 314, a quantizer 316, and an entropy coder 318. The pixel block coder 310 may accept pixel blocks of input data at the subtractor 312. The subtractor 312 may receive predicted pixel blocks from the predictor 350 and generate an array of pixel residuals therefrom representing a difference between the input pixel block and the predicted pixel block. The transform unit 314 may apply a transform to the residual data output from the subtractor 312, to convert data from the pixel domain to a domain of transform coefficients. The quantizer 316 may perform quantization of transform coefficients output by the transform unit 314. The entropy coder 318 may reduce bandwidth of the output of the coefficient quantizer by coding the output, for example, by variable length code words.

The transform unit 314 may operate in a variety of transform modes as determined by the controller 360. For example, the transform unit 314 may apply a discrete cosine transform (DCT), a discrete sine transform (DST), a Walsh-Hadamard transform, a Haar transform, a Daubechies wavelet transform, or the like. In an embodiment, the controller 360 may select a coding mode M to be applied by the transform unit 314, may configure the transform unit 314 accordingly and may signal the coding mode M in the coded video data, either expressly or impliedly.

The quantizer 316 may operate according to a quantization parameter H that is supplied by the controller 360. In an embodiment, the quantization parameter H may be applied to the transform coefficients as a multi-value matrix of quantization values, which may vary, for example, across different coefficient locations (i,j) within a transform-domain pixel block T. Thus, the quantization parameter H may be provided as an array of values $H_{i,j}$ as discussed below.

The pixel block decoder 320 may invert coding operations of the pixel block coder 310. For example, the pixel block decoder 320 may include a dequantizer 322, an inverse transform unit 324, and an adder 326. The pixel block decoder 320 may take its input data from an output of the quantizer 316. Although permissible, the pixel block decoder 320 need not perform entropy decoding of entropy-coded data since entropy coding is a lossless event. The dequantizer 322 may invert operations of the quantizer 316 of the pixel block coder 310. The dequantizer 322 may perform de-quantization as specified by the quantization parameter H. Similarly, the inverse transform unit 324 may invert operations of the transform unit 314. The dequantizer 322 and the inverse transform unit 324 may use the same quantization parameters H and transform mode M as their counterparts in the pixel block coder 310. As discussed, quantization operations likely will truncate data in various respects and, therefore, data recovered by the dequantizer 322 likely will possess coding errors when compared to the data presented to the quantizer 316 in the pixel block coder 310.

The adder 326 may invert operations performed by the subtractor 312. It may receive the same prediction pixel block from the predictor 350 that the subtractor 312 used in generating residual signals. The adder 326 may add the prediction pixel block to reconstructed residual values output by the inverse transform unit 324 and may output reconstructed pixel block data.

The in-loop filter 330 may perform various filtering operations on recovered pixel block data. For example, the in-loop filter 330 may include a deblocking filter 332 and a sample adaptive offset ("SAO") filter 333. The deblocking filter 332 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 330 may operate according to parameters that are selected by the controller 360.

The picture buffer 340 may store filtered pixel data for use in later prediction of other pixel blocks. Different types of prediction data are made available to the predictor 350 for different prediction modes. For example, for an input pixel block, intra prediction takes a prediction reference from decoded data of the same picture in which the input pixel block is located. Thus, the picture buffer 340 may store decoded pixel block data of each picture as it is coded. For the same input pixel block, inter prediction may take a prediction reference from previously coded and decoded picture(s) that are designated as reference pictures. Thus, the picture buffer 340 may store these decoded reference pictures.

As discussed, the predictor 350 may supply prediction data to the pixel block coder 310 for use in generating residuals. The predictor 350 may include an inter predictor 352, an intra predictor 353 and a mode decision unit 352. The inter predictor 352 may receive pixel block data representing a new pixel block to be coded and may search for reference picture data from buffer 340 for pixel block data from reference picture(s) for use in coding the input pixel block. The inter predictor 352 may support a plurality of prediction modes, such as P mode coding and B mode coding. The inter predictor 352 may select an inter prediction mode and an identification of candidate prediction reference data that provides a closest match to the input pixel block being coded. The inter predictor 352 may generate prediction reference metadata, such as motion vectors, to identify which portion(s) of which reference pictures were selected as source(s) of prediction for the input pixel block.

The intra predictor 353 may support Intra (I) mode coding. The intra predictor 353 may search from among decoded pixel block data from the same picture as the pixel block being coded that provides a closest match to the input pixel block. The intra predictor 353 also may generate prediction reference indicators to identify which portion of the picture was selected as a source of prediction for the input pixel block.

The mode decision unit 352 may select a final coding mode to be applied to the input pixel block. Typically, as described above, the mode decision unit 352 selects the prediction mode that will achieve the lowest distortion when video is decoded given a target bitrate. Exceptions may arise when coding modes are selected to satisfy other policies to which the coding system 300 adheres, such as satisfying a particular channel behavior, or supporting random access or data refresh policies. When the mode decision selects the final coding mode, the mode decision unit 352 may output selected reference block from the buffer 340 to the pixel block coder and decoder 310, 320 and may supply to the controller 360 an identification of the selected prediction mode along with the prediction reference indicators corresponding to the selected mode.

The controller 360 may control overall operation of the coding system 300. The controller 360 may select operational parameters for the pixel block coder 310 and the predictor 350 based on analyses of input pixel blocks and also external constraints, such as coding bitrate targets and other operational parameters. As is relevant to the present discussion, when it selects quantization matrices H and/or the transform mode M, it may provide those parameters to the syntax unit 370, which may include data representing those parameters in the data stream of coded video data output by the system 300.

Additionally, as discussed, the controller 360 may control operation of the in-loop filter 330 and the prediction unit 350. Such control may include, for the prediction unit 350, mode selection (lambda, modes to be tested, search windows, distortion strategies, etc.), and, for the in-loop filter 330, selection of filter parameters, reordering parameters, weighted prediction, etc.

Quantization may occur by quantizing transform coefficients $T_{i,j}$ output by the transform unit 314 by quantization values $H_{i,j}$. For example, a transform process may generate an array of transform coefficients that may be represented as follows:

$$T = \begin{bmatrix} T_{0,0} & \cdots & T_{max,0} \\ \vdots & \ddots & \vdots \\ T_{0,max} & \cdots & T_{max,max} \end{bmatrix},$$

where $T_{0,0}$ is a coefficient representing a lowest-frequency content of the transformed pixel block (essentially, a DC coefficient) and coefficients $T_{i,j}$ represent frequency coefficients of the transformed pixel block at horizontal and vertical frequencies represented, respectively, by the indices i, and j. Thus, a coefficient $T_{max,max}$ may represent content of the transformed pixel block at the highest available frequency in both the horizontal and vertical directions. Quantization may generate quantized coefficient values $T'_{i,j}$ that are quantized by quantization values $H_{i,j}$ (e.g., $$T'_{i,j} = \frac{T_{i,j}}{H_{i,j}}\Bigg).$$

The quantizer 316 may operate according to quantization matrices that are developed by the encoder 200. The quantization values $H_{i,j}$ also may be represented as an array having the following form:

$$\overline{H} = \begin{bmatrix} H_{0,0} & \cdots & H_{max,0} \\ \vdots & \ddots & \vdots \\ H_{0,max} & \cdots & H_{max,max} \end{bmatrix}$$

Thus, the quantization value $H_{0,0}$ may quantize the lowest-frequency coefficient $T_{0,0}$ of a transform block, the quantization value $H_{max,max}$ may quantize the highest-frequency coefficient $T_{max,max}$ of the transform block, and the quantization values $H_{i,j}$ may quantize coefficients $T_{i,j}$ at the intermediate positions of the transform block. Because the quantization values $H_{i,j}$ are applied to transform coefficients $T_{i,j}$ at frequency indices (i,j) it is often convenient to label the quantization values $H_{i,j}$ based on the frequency indices to which they correspond. For example, $H_{0,0}$ may described as a DC quantization value, $H_{max,max}$ may be described as a high-frequency quantization value, etc. And, as the frequency indices (i,j) increase in either the i or the j direction, the quantization values $H_{i,j}$ are described as corresponding to higher-frequency quantization values.

In an embodiment, the quantization matrices may be developed by modifying an existing default matrix in a manner that preserves transform coefficients relating to lower-frequency content and quantizes transform coefficients relating to higher-frequency content. For example, the HEVC coding protocol defines a default matrix of quantization values, which may be altered by an encoder at various points during a coding session. According to an embodiment, the quantization values defined by a default matrix $\overline{H}$ may be altered to define a new quantization matrix $\overline{H}'$ that adapts to the characteristics of the video.

In a first embodiment, the new quantization matrix $\overline{H}'$ may be defined by scaling quantization values of the default matrix based on their distance from an origin of the matrix $\overline{H}'$. For example values $H'_{i,j}$ may be derived having the form:

$H'_{i,j} = A_{i,j} \cdot H_{i,j}$, where $A_{i,j}$ represents a scalar value at position (i,j) and $H_{i,j}$ represents a value from the default quantization matrix H at position (i,j). The scalar value $A_{i,j}$ may have its lowest value at an origin position (0,0) of the matrix $\overline{H}'$, its greatest value at a position (max,max) corresponding to a highest frequency transform coefficient and having values at positions (i,j) that generally decrease as either i or j increases. In this manner, as coefficient positions (i,j) that increase their distance from the origin position (0,0), the quantization values $H'_{i,j}$ also will increase and the quantization matrix $\overline{H}'$ will apply higher levels of quantization to the transform coefficients representing higher frequencies. In one example, the values $A_{i,j}$ may be given as:

$$A_{i,j} = e^{k \cdot d_{i,j}}, \text{ where}$$

$d_{i,j}$ represents a distance of the position (i,j) from the origin position (0,0) of the matrix $\overline{H}'$ and k represents a constant scalar. As illustrated, the values $A_{i,j}$ may be constrained to fall within the range 1 to $e^k$.

In another embodiment, the new quantization matrix $\overline{H}'$ may be defined by scaling quantization values of the default matrix based on ambient conditions for video capture or coding. For example values $H'_{i,j}$ may be derived having the form:

$$H'_{i,j} = A_{PARAM} \cdot H_{i,j}, \text{ where}$$

$A_{PARAM}$ represents parameter(s) reflecting the capture or coding conditions.

For example, the $A_{PARAM}$ value may be derived in response to parameters of the video source 220 (FIG. 2), such as exposure values used by a camera when performing video capture. An increase in exposure values used by a camera tends to suggest that video sequences generated therefrom will have less motion blur with fast shutter speed. In such a case, a quantization matrix may be derived with relatively low quantization values that should preserved details in image content, which typically is represented by higher-frequency transform coefficients. By contrast, a decrease in exposure values used by a camera tends to suggest that video sequences generated therefrom will have more motion blur with slow shutter speed. In such a case, a quantization matrix may be derived with relatively high quantization values, which may truncate transform coefficients and save more bits without large visual quality differences. Thus, the $A_{PARAM}$ value may be varied proportionally with the exposure values when generating a new quantization matrix $\overline{H}'$.

Similarly, a camera (or an image pre-processor) may estimate SNR values from the video data itself rather than from parameters of the camera system. Video frames with low SNR typically have much more noise with energy concentrated in mostly high frequency coefficients. Therefore, the quantization matrix can be designed such that those high frequency coefficients can be quantized more heavily. This also has the added visual benefits of reducing noise in the video signal. As described, portions of a video sequence that are estimated as having low SNR values may be assigned higher quantization values to reduce noise in the video sequence. By contrast, portions of a video sequence that are estimated as having high SNR values may be assigned lower quantization values to preserve image content at the higher frequencies. Thus, the $A_{PARAM}$ value may be varied inversely proportionally with the SNR values when generating a new quantization matrix $\overline{H}'$.

In an embodiment, quantization matrices may be generated based on analyses of entire frames, in which case there may be a single quantization matrix per frame, or based on analyses of sub-regions of frames, in which case new quantization matrices may be defined for each region so analyzed. Thus, exposure value analyses and/or SNR value analyses may be performed on a frame-by-frame basis or on a region-by-region basis and the results of such separate analyses may lead to separate quantization matrices. In another embodiment, region-based analyses may be performed on sub-frame regions along multiple frames temporally. Regions may be identified based on foreground/background discrimination processes, based on object detection processes, based on histographic analyses of the exposure value distributions and/or SNR value distributions within frames.

The $A_{PARAM}$ value may be derived in response to predefined coding scheme such as based on frame resolution or frame rate.

In a further embodiment, the values $A_{i,j}$ may be derived based on both distance from an origin position and based on ambient capture or coding parameters. In this embodiment, for example, the values $A_{i,j}$ may take the form:

$$A_{i,j} = e^{k \cdot d_{i,j}} \frac{PARAM_{max} - PARAM_{min}}{\text{Clip}(PARAM, PARAM_{min}, PARAM_{max})},$$

where
$d_{i,j}$ represents a distance of the position (i,j) from the origin position (0,0) of the matrix $\overline{H}'$, PARAM is a number derived from the capture or coding parameter at issue, and k represents a constant scalar. In this example, the PARAM value may be applied in a clipping function that is bounded by minimum and maximum values $PARAM_{min}$ and $PARAM_{max}$. And, again, the values $A_{i,j}$ may be always larger than or equal to 1.

As indicated, the distance values $d_{i,j}$ may be numbers that reflect the distance of a given position (i,j) from an origin of the matrix. In one embodiment, the distance values $d_{i,j}$ may be calculated as:

$$d_{i,j} = \sqrt{\frac{(i_0 - i)^2 + (j_0 - j)^2}{(i_0 - i_{max})^2 + (j_0 - j_{max})^2}},$$

where
i and j represent indices of the position (i,j), $i_0$ and $j_0$ represent indices of the origin position (0,0), and $i_{max}$ and $j_{max}$ represent indices of the position of the highest frequency represented in the new quantization matrix $\overline{H}'$.

Figure 4:
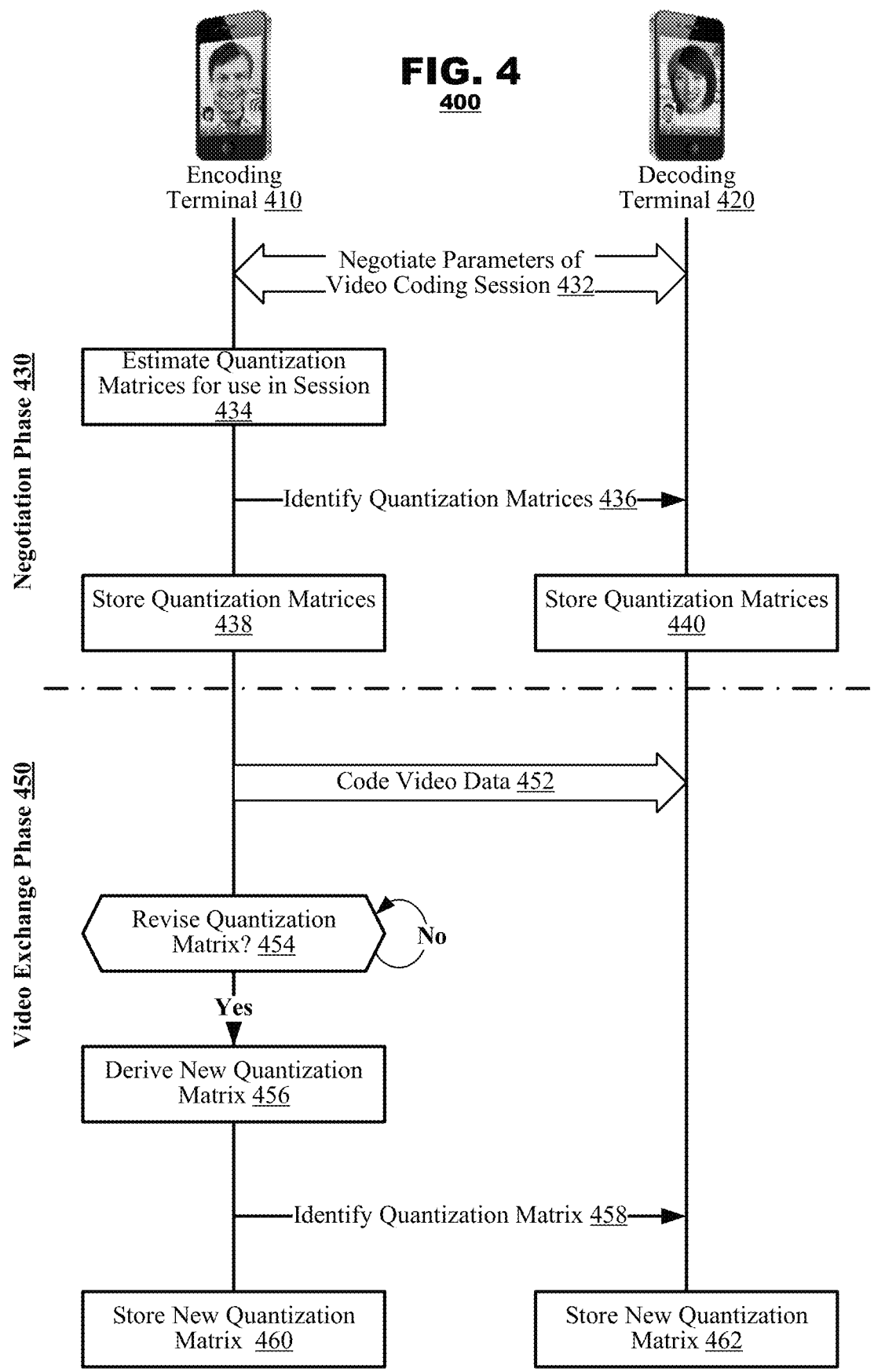
FIG. 4 illustrates communication flow between an encoding terminal and a decoding terminal to exchange data defining quantization matrices according to an embodiment of the present disclosure.

FIG. 4 illustrates communication flow between an encoding terminal 410 and a decoding terminal 420 to exchange data defining quantization matrices that will be used during a coding session. Video coding sessions typically proceed in multiple phases including a negotiation phase 430 where the terminals 410, 420 exchange data defining initial parameters to be used in the video coding session (colloquially, "negotiation messages") and video exchange phase 450 where the terminals 410, 420 exchange coded video.

FIG. 4 illustrates that the terminals 410, 420 exchange negotiation messages 432 defining various parameters of the coding session. As part of the negotiation phase 430, the encoding terminal 410 may estimate quantization matrices that will be used in the coding session (box 434). The encoding terminal 410 may communicate messages 436 identifying the quantization matrices to the decoding terminal 420. The encoding terminal 410 and decoding terminal 420 both may store the quantization matrices locally for use during the coding session (boxes 438, 440).

Once the video exchange phase 450 is established, the encoding terminal 410 may transmit coded video data to the decoding terminal 420 (msg. 452). At various times during the video exchange phase 450, the encoding terminal 410 may determine whether quantization matrices should be revised (box 454). If so, the encoding terminal 410 may estimate a new quantization matrix that for use during the video exchange phase 450 (box 456). The encoding terminal 410 may communicate a message 458 identifying the new quantization matrix to the decoding terminal 420. The encoding terminal 410 and decoding terminal 420 both may store the new quantization matrix locally for use during the video exchange phase 450 (boxes 460, 462). The operations of boxes 454-462 may be repeated throughout the video exchange phase 450 as many times as may be convenient.

As indicated, the terminals 410, 420 may operate according to a predetermined coding protocol, such as HEVC. New quantization matrices may be identified in picture parameter dataset messages or other signaling messages that are designed to accommodate them. In an embodiment, the new quantization matrices may be defined differentially with respect to default quantization matrices that are defined by the governing coding protocol.

In an embodiment, an encoding terminal 410 may derive a variety of quantization matrices during the negotiation phase 430 that will be used during the video exchange phase 450. In one embodiment, the terminal 410 may develop quantization matrices at a variety of matrix sizes that are supported by the governing coding protocol. For example, HEVC supports scaling matrices at sizes of 4×4, and 8×8 (i.e., $i_{max}$ and $j_{max}$ are both 3, and 7, respectively). The new scaling matrix can be derived accordingly on matrix size, and in one example the bigger scaling matrices at sizes of 16×16 and 32×32 are derived from smaller size matrices. Moreover, the encoding terminal 410 may derive quantization matrices for a variety of different coding/capture parameter settings (e.g., exposure values, SNR values, frame rate or resolution) that are expected to occur during the exchange phase 450. The encoding terminal 410 may communicate the different matrices to a decoding terminal 420 during the negotiation phase 430 in a manner that causes each matrix to be assigned its own index number. Thereafter, during coding, the encoding terminal 410 may identify, in coded video data, the different matrices that are used to quantize different portions of an input video sequence by their index numbers. On decode, the decoding terminal 420 may retrieve the quantization matrices so identified to invert quantization of the different portions of video data.

Figure 5:
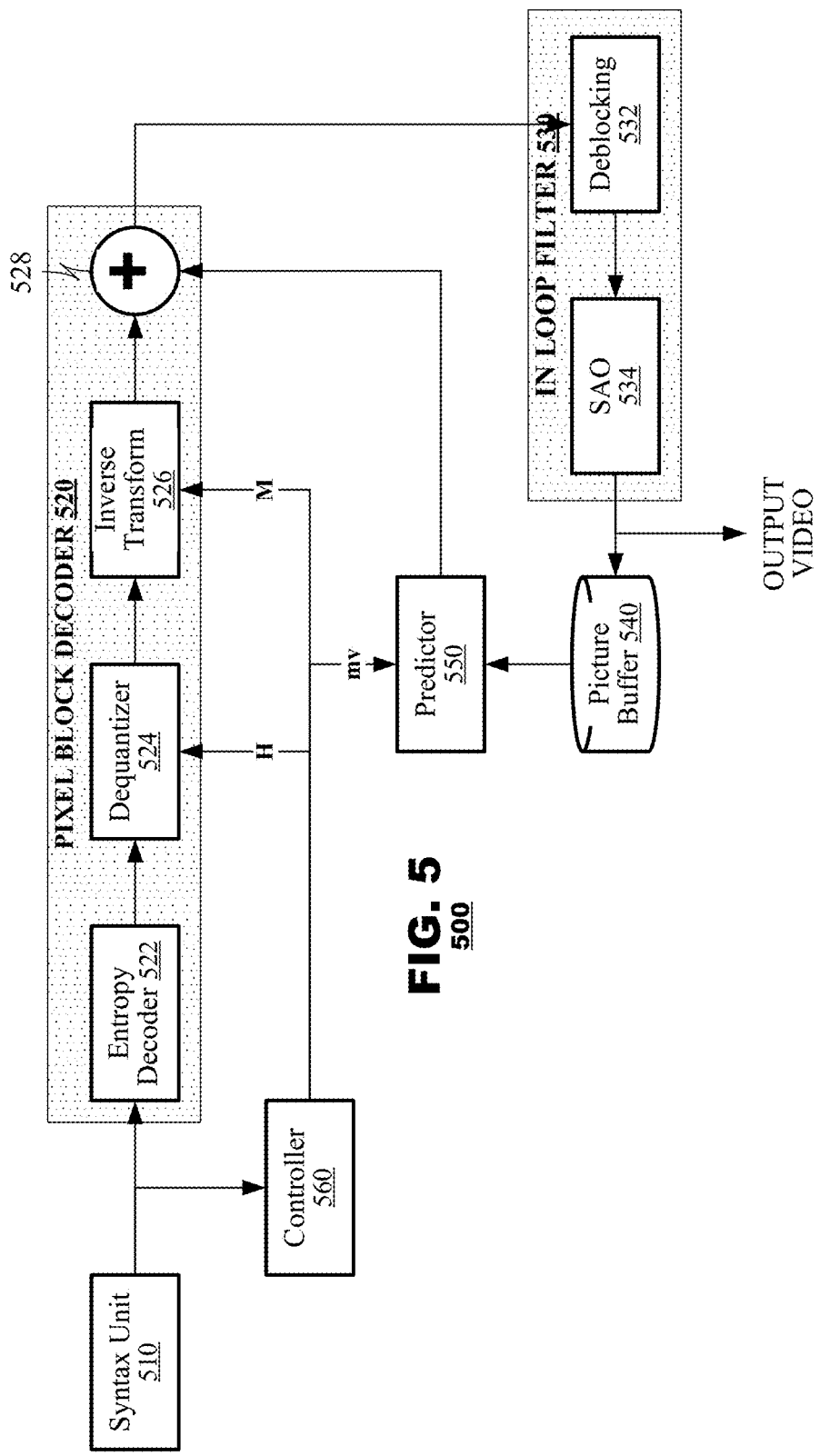
FIG. 5 is a functional block diagram of a decoding system according to an embodiment of the present disclosure.

FIG. 5 is a functional block diagram of a decoding system 500 according to an embodiment of the present disclosure. The decoding system 500 may include a syntax unit 510, a pixel block decoder 520, an in-loop filter 530, a picture buffer 540, a predictor 550, and a controller 560. The syntax unit 510 may receive a coded video data stream and may parse the coded data into its constituent parts. Data representing coding parameters may be furnished to the controller 560 while data representing coded residuals (the data output by the pixel block coder 310 of FIG. 3) may be furnished to the pixel block decoder 520. The pixel block decoder 520 may invert coding operations provided by the pixel block coder 310 (FIG. 3). The in-loop filter 530 may filter reconstructed pixel block data. The reconstructed pixel block data may be assembled into pictures for display and output from the decoding system 500 as output video. The pictures also may be stored in the picture buffer 540 for use in prediction operations. The predictor 550 may supply prediction data to the pixel block decoder 520 as determined by coding data received in the coded video data stream.

The pixel block decoder 520 may include an entropy decoder 522, a dequantizer 524, an inverse transform unit 526, and an adder 528. The entropy decoder 522 may perform entropy decoding to invert processes performed by the entropy coder 318 (FIG. 3). The dequantizer 524 may invert operations of the quantizer 316 of the pixel block coder 310 (FIG. 3). Similarly, the inverse transform unit 526 may invert operations of the transform unit 314 (FIG. 3). They may use the quantization matrices H and transform modes M that are provided in the coded video data stream. Because quantization is likely to truncate data, the data recovered by the dequantizer 524 likely will possess coding errors when compared to the input data presented to its counterpart quantizer 316 in the pixel block coder 310 (FIG. 3).

The adder 528 may invert operations performed by the subtractor 311 (FIG. 3). It may receive a prediction pixel block from the predictor 550 as determined by prediction references in the coded video data stream. The adder 528 may add the prediction pixel block to reconstructed residual values output by the inverse transform unit 526 and may output reconstructed pixel block data.

The in-loop filter 530 may perform various filtering operations on reconstructed pixel block data. As illustrated, the in-loop filter 530 may include a deblocking filter 532 and an SAO filter 534. The deblocking filter 532 may filter data at seams between reconstructed pixel blocks to reduce discontinuities between the pixel blocks that arise due to coding. SAO filters 534 may add offset to pixel values according to an SAO type, for example, based on edge direction/shape and/or pixel level. Other types of in-loop filters may also be used in a similar manner. Operation of the deblocking filter 532 and the SAO filter 534 ideally would mimic operation of their counterparts in the coding system 300 (FIG. 3). Thus, in the absence of transmission errors or other abnormalities, the decoded picture obtained from the in-loop filter 530 of the decoding system 500 would be the same as the decoded picture obtained from the in-loop filter 330 of the coding system 300 (FIG. 3); in this manner, the coding system 300 and the decoding system 500 should store a common set of reference pictures in their respective picture buffers 340, 540.

The picture buffer 540 may store filtered pixel data for use in later prediction of other pixel blocks. The picture buffer 540 may store decoded pixel block data of each picture as it is coded for use in intra prediction. The picture buffer 540 also may store decoded reference pictures.

As discussed, the predictor 550 may supply the transformed reference block data to the pixel block decoder 520. The predictor 550 may supply predicted pixel block data as determined by the prediction reference indicators (commonly, motion vectors my) supplied in the coded video data stream.

The controller 560 may control overall operation of the coding system 500. The controller 560 may set operational parameters for the pixel block decoder 520 and the predictor 550 based on parameters received in the coded video data stream. As is relevant to the present discussion, these operational parameters may include quantization matrices H for the dequantizer 524 and transform modes M for the inverse transform unit 526.

Although the foregoing discussion has described the foregoing embodiments of the present disclosure in the context of coders and decoders that process video data, the principles of the present disclosure are not so limited. Quantization matrices may be defined for frames of a video sequence, either on a frame-by-frame basis or a region-by-region basis, as described above. In another embodiment, the principles of the present disclosure may find application in a coding environment that processes a single image (a "still image," for convenience to distinguish coding of motion picture video) rather than a video sequence composed of multiple frames. Here, again, a single quantization matrix may be defined for the still image or a plurality of quantization matrices may be defined each for a respective region of the still image.

The foregoing discussion has described operation of the embodiments of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic- and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Figure 6:
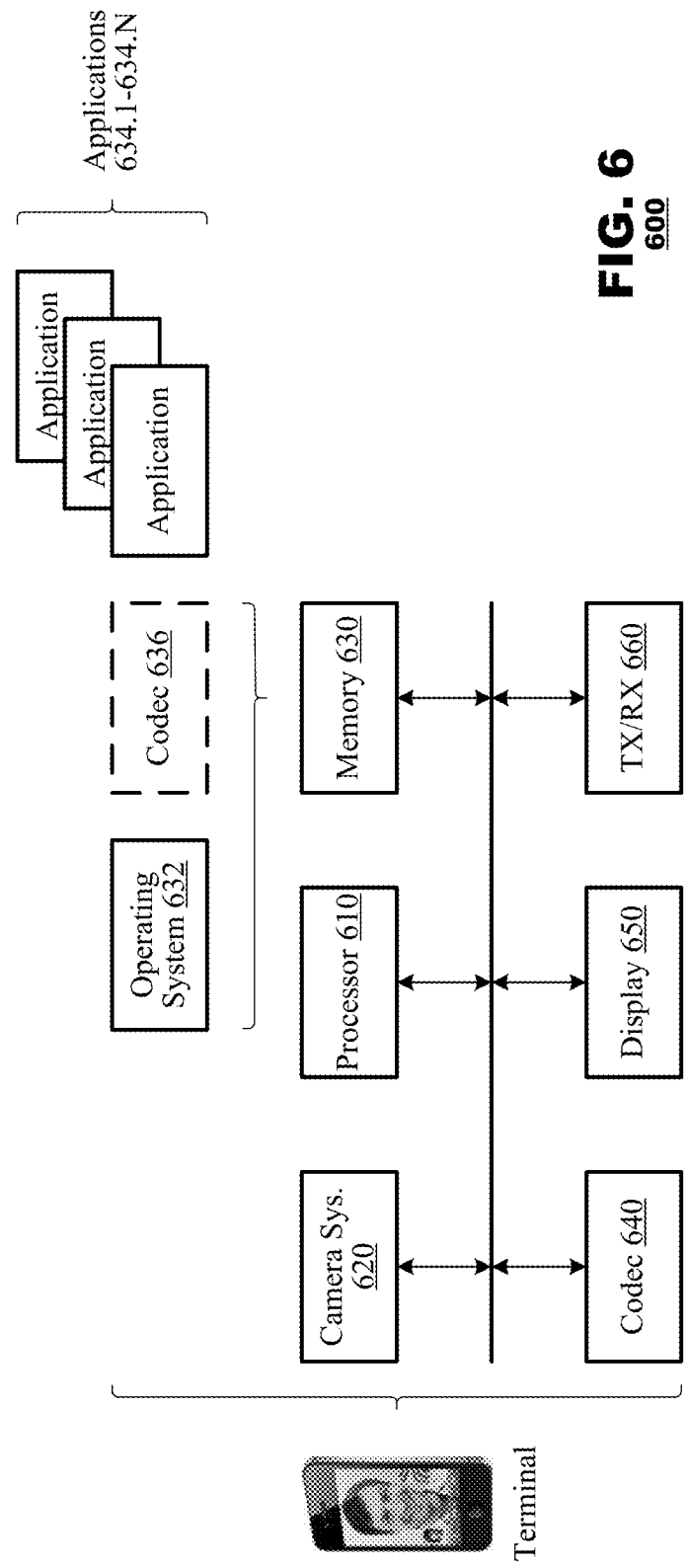
FIG. 6 illustrates an exemplary computer system according to an embodiment of the present disclosure.

For example, the techniques described herein may be performed by a central processor of a computer system. FIG. 6 illustrates an exemplary computer system 600 that may perform such techniques. The computer system 600 may include a central processor 610, one or more cameras 620, a memory 630, a coder/decoder 640 ("codec"), a display 650, and a transceiver 660 provided in communication with one another.

The central processor 610 may read and execute various program instructions stored in the memory 630 that define an operating system 632 of the system 600 and various applications 634.1-634.N. As it executes those program instructions, the central processor 610 may read, from the memory 630, image data created either by the camera 620 or the applications 634.1-634.N, which may be coded for transmission. In an embodiment, rather than provide a hardware-based coded 640, the central processor 610 may execute a program 636 that operates as a codec.

The codec, whether provided as a hardware-based codec 640 or a software-based codec 636, may perform operations illustrated in FIGS. 2(a)-5 to code and/or decode video data. As part of its operation, the codec 640/636 may derive new quantization matrices and signal them to a counter-part codec (not shown) in another device.

The display 650 may be a display device through which the system 600 output locally-generated video, either generated by the camera system 620, the operating system 632, the coded 640/636, an application 634.1-634.N or a combination thereof. For example, it is common for terminals in video coding sessions to output decoded video supplied by a far-end device in a main portion of a display and also to display locally-captured video in an inset of a display.

The transceiver 660 may represent a communication system to transmit transmission units and receive acknowledgement messages from a network (not shown). In an embodiment where the central processor 610 operates a software-based video coder, the transceiver 660 may place data representing state of acknowledgment message in memory 630 to retrieval by the processor 610. In an embodiment where the system 600 has a dedicated coder, the transceiver 660 may exchange state information with the coder 650.

As indicated, the memory 630 may store program instructions that, when executed, cause the processor to perform the techniques described hereinabove. The memory 630 may store the program instructions on electrical-, magnetic- and/or optically-based storage media.

The foregoing description has been presented for purposes of illustration and description. It is not exhaustive and does not limit embodiments of the disclosure to the precise forms disclosed. Modifications and variations are possible in light of the above teachings or may be acquired from the practicing embodiments consistent with the disclosure. Unless described otherwise herein, any of the methods may be practiced in any combination.

We claim:

1. A method, comprising:
defining a first quantization matrix from a second quantization matrix by scaling quantization values of the second quantization matrix by scaling parameters that vary proportionately with camera exposure value of a capture operation that generated an image,
communicating values of the first quantization matrix to a decoder, and
predictively coding a portion of the image, wherein the coding comprises:
transforming pixel data of the image to a plurality of frequency domain coefficients, and
quantizing the frequency domain coefficients according to the first quantization matrix.

2. The method of claim 1, wherein the exposure value is an image-level exposure value of the image.

3. The method of claim 1, wherein the exposure value is an exposure value of a region of the image, smaller than the image.

4. The method of claim 1, wherein the first quantization matrix definition is further based on an estimated signal-to-noise ratio of the image.

5. The method of claim 4, wherein the estimated signal-to-noise ratio is an image-level signal-to-noise value.

6. The method of claim 4, wherein the estimated signal-to-noise ratio is a signal-to-noise ratio of a region of the image, smaller than the image.

7. The method of claim 1, wherein the first quantization matrix definition is further based on a resolution of the image as it is coded.

8. The method of claim 1, wherein the scaling parameters increase according to a distance between each matrix position and a matrix origin.

9. The method of claim 1, wherein values of the first quantization matrix are communicated in a picture parameter dataset message of a governing coding protocol.

10. The method of claim 1, wherein values of the first quantization matrix are communicated differentially with respect to the second quantization matrix.

11. The method of claim 1, wherein the image is a part of a multi-frame video sequence and the method repeats for a plurality of frames of the video sequence.

12. The method of claim 11, wherein the first quantization matrix definition is further based on a frame rate of the video sequence as it is coded.

13. The method of claim 11, wherein values of the first quantization matrix are communicated during a negotiation phase of a coding session.

14. The method of claim 11, wherein values of the first quantization matrix are communicated during a video exchange phase of a coding session.

15. The method of claim 11, wherein the defining and communicating are repeated for a plurality of quantization matrices that are communicated to the decoder, and coded video data of different coded portions of the video sequence include identifiers of the quantization matrices that were used, respectively, for the quantizing of the different portions of the video sequence.

16. A non-transitory computer readable medium having stored thereon program instructions that, when executed by a processing device, cause the device to:

define a first quantization matrix from a second quantization matrix by scaling quantization values of the second quantization matrix by scaling parameters that vary proportionately with camera exposure value of a capture operation that generated an image, communicate values of the first quantization matrix to a decoder, and predictively code a portion of the image, wherein the coding comprises:

transforming pixel data of the image to a plurality of frequency domain coefficients, and quantizing the frequency domain coefficients according to the first quantization matrix.

17. The medium of claim 16, wherein the first quantization matrix definition is further based on an estimated signal-to-noise ratio of the image.

18. The medium of claim 16, wherein the first quantization matrix definition is further based on a resolution of the image as it is coded.

19. The medium of claim 16, wherein the image is part of a multi-frame video sequence and the first quantization matrix definition is further based on a frame rate of the video sequence as it is coded.

20. The medium of claim 16, wherein the scaling parameters increase according to a distance between each matrix position and a matrix origin.

21. The medium of claim 16, wherein values of the first quantization matrix are communicated in a picture parameter dataset message of a governing coding protocol.

22. The medium of claim 16, wherein values of the first quantization matrix are communicated differentially with respect to the second quantization matrix.

23. Apparatus, comprising:

a pixel block coder, comprising a transform unit having an input for pixel block data of an input image and an output for transform-domain coefficients, and a quantizer, having inputs for the transform-domain coefficients and for values of a quantization matrix, and an output for quantized transform-domain coefficients;

a controller to define a first quantization matrix from a second quantization matrix by scaling quantization values of the second quantization matrix by scaling parameters that vary proportionately with camera exposure value of a capture operation that generated an image.

24. The method of claim 1, where elements of the second quantization matrix are defined by $$H_{i,j}'=A_{i,j} \cdot H_{i,j}$$

where (i, j) indicates which element of a matrix, H' is the first quantization matrix, H is the second quantization matrix, and A is a matrix of the linear scaling parameters.

25. The method of claim 1, wherein the characteristic is a camera exposure value of a capture operation that generated the image, and the linear scaling parameters vary proportionally with the camera exposure value.

26. The method of claim 1, wherein the characteristic is an estimated signal-to-noise ratio of the image, and the linear scaling parameters vary inversely proportionally with the estimated signal-to-noise ratio.

27. The method of claim 1, wherein the scaling parameters are linear scaling parameters.

* * * * *